US011071410B1

(12) United States Patent
Clarke

(10) Patent No.: US 11,071,410 B1
(45) Date of Patent: Jul. 27, 2021

(54) TOASTER DRIPPING TRAY

(71) Applicant: Millicent A. Clarke, New York, NY (US)

(72) Inventor: Millicent A. Clarke, New York, NY (US)

( * ) Notice: Subject to any disclaimer, the term of this patent is extended or adjusted under 35 U.S.C. 154(b) by 0 days.

(21) Appl. No.: 16/433,025

(22) Filed: Jun. 6, 2019

(51) Int. Cl.
*A47J 37/08* (2006.01)
*H05B 3/12* (2006.01)
*H05B 1/02* (2006.01)
*H05B 3/26* (2006.01)

(52) U.S. Cl.
CPC ....... *A47J 37/0871* (2013.01); *A47J 37/0814* (2013.01); *H05B 1/0261* (2013.01); *H05B 3/12* (2013.01); *H05B 3/265* (2013.01); *H05B 2203/002* (2013.01); *H05B 2203/032* (2013.01)

(58) Field of Classification Search
CPC . A47J 37/0814; A47J 37/0688; A47J 37/0871
See application file for complete search history.

(56) References Cited

U.S. PATENT DOCUMENTS

| | | | | |
|---|---|---|---|---|
| 1,543,362 | A | | 6/1925 | Boletino |
| 2,329,937 | A | * | 9/1943 | Orkfritz ............ A47J 37/0688 99/335 |
| 2,345,769 | A | * | 4/1944 | Osrow ................ A47J 37/0814 99/327 |
| 2,596,243 | A | | 5/1952 | Ireland |
| 3,636,858 | A | | 1/1972 | Paaskesen |
| 3,669,002 | A | * | 6/1972 | Davidson ............ A47J 37/0688 99/327 |
| 4,285,272 | A | | 8/1981 | Klijnstra |
| 4,901,631 | A | * | 2/1990 | Russell ............... A47J 37/0688 219/521 |
| 4,972,767 | A | * | 11/1990 | Russell ............... A47J 37/0688 99/339 |
| D323,094 | S | * | 1/1992 | Russell ......................... D7/329 |
| 5,542,346 | A | * | 8/1996 | Shenk ................. A47J 37/0871 99/375 |
| D404,251 | S | | 1/1999 | Souther |
| 6,244,166 | B1 | * | 6/2001 | Lebron ................... A47J 37/08 219/494 |
| 6,444,954 | B1 | * | 9/2002 | Blankenship ....... A47J 37/0635 219/386 |
| 6,854,380 | B2 | * | 2/2005 | Wanat ................. A47J 37/0871 99/389 |
| 7,467,583 | B2 | * | 12/2008 | Lam ..................... A47J 37/0814 219/386 |
| 2002/0073851 | A1 | * | 6/2002 | Chung ................. A47J 37/0814 99/327 |
| 2002/0073854 | A1 | * | 6/2002 | Chasen ............... A47J 37/0664 99/385 |
| 2004/0211324 | A1 | * | 10/2004 | Wanat ................. A47J 37/0871 99/385 |

(Continued)

*Primary Examiner* — Robert J Utama
*Assistant Examiner* — Lawrence H Samuels
(74) *Attorney, Agent, or Firm* — Cramer Patent & Design, PLLC; Aaron R. Cramer

(57) ABSTRACT

A toaster dripping tray is placed within a traditionally configured toaster and removably disposed there beneath. The tray covers the entire bottom of the toaster. When incorporated into a toaster, the normally present dripping channel gate resting above the narrow dripping removal tray is not present.

6 Claims, 5 Drawing Sheets

(56) References Cited

U.S. PATENT DOCUMENTS

| | | | |
|---|---|---|---|
| 2005/0204927 A1* | 9/2005 | Boyle | A47J 37/0857 99/389 |
| 2006/0182862 A1* | 8/2006 | Ely | A47J 27/04 426/523 |
| 2008/0173185 A1* | 7/2008 | Lam | A47J 37/0814 99/339 |
| 2008/0279998 A1* | 11/2008 | Park | A47J 37/085 426/466 |
| 2009/0301313 A1* | 12/2009 | Leaman | A47J 37/0814 99/393 |
| 2010/0122977 A1* | 5/2010 | Yang | A47J 37/0871 219/520 |
| 2014/0352549 A1* | 12/2014 | Upston | A47J 37/085 99/334 |
| 2015/0053093 A1* | 2/2015 | Chang | A47J 37/0807 99/341 |

\* cited by examiner

TOASTER DRIPPING TRAY

FIELD OF THE INVENTION

The present invention relates to toasters. More specifically, it relates to toasters having a toaster dripping tray.

BACKGROUND OF THE INVENTION

Toast has been a staple of breakfast for countless generations. It is most typically made by the use of a countertop electric toaster which heats the bread on both sides thus producing its wonderful flavor and taste. Many toasters are provided with a crumb tray which is slid out after use of the toaster to remove any crumbs that should fall from the bread product during the toasting process.

While certainly a good feature, many of these trays are very narrow, perhaps just a few inches wide. This means that much of the crumbs that fall do not land in the tray, but instead on other portions of the toaster bottom where they can build up over time leading to problems such as increased fire risk, and the tendency to attract insects. Accordingly, there exists a need for a means by which crumb trays on toasters can be modified to address the above described problem. The development of the toaster dripping tray fulfills this need.

SUMMARY OF THE INVENTION

The principles of the present invention provide for a toaster, comprising an operating lever, a timer control, a plurality of operating push buttons, a power cord controlling operation of the toaster and a crumb tray and an associated handle disposed on a lower portion of the toaster. The crumb tray completely covers a width of a plurality of toasting cavities. The toaster also comprises a movable support platform having a permeable horizontal surface. The movable support platform allows for passing of a plurality of crumbs into the crumb tray.

The toaster may comprise an electrically operated kitchen countertop appliance that toasts a food product. The food product toasted within the toasting cavities may be restrained by a plurality of movable support platforms as well as a plurality of restraint rods. The restraint rods may restrain the food product from contacting a plurality of electric heating elements. The electric heating elements may be a plurality of nichrome wires and may be displaced along a heat resistant surface.

The heat resistant surface may be mica. The movable support platforms may provide a lower support for the food product being toasted and may be permeable. The crumbs may travel along a crumb travel path and enter an open top of the crumb tray where they remain captive. There may be no interfering horizontal surfaces along the crumb travel path that serve to restrain the crumbs and prevent complete cleaning of the toaster.

The crumb tray may be removable with aid of the tray slides located along a plurality of long slides of the crumb tray near the open top. The movable support platforms may be connected into an electromechanical control mechanism which control energization, movement and operation of the movable support platforms. The crumb tray along with its included tray may slide while the handle remains visible and unobstructed. The restraint rods, the electric heating elements and the heat resistant surface may be present with no horizontal surfaces to otherwise trap the crumbs. The user may access the crumb tray by pulling on the handle until it is completely removed from the toaster. The crumb tray may be inverted to empty the captured crumbs into a receptacle such as a sink or trash can.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
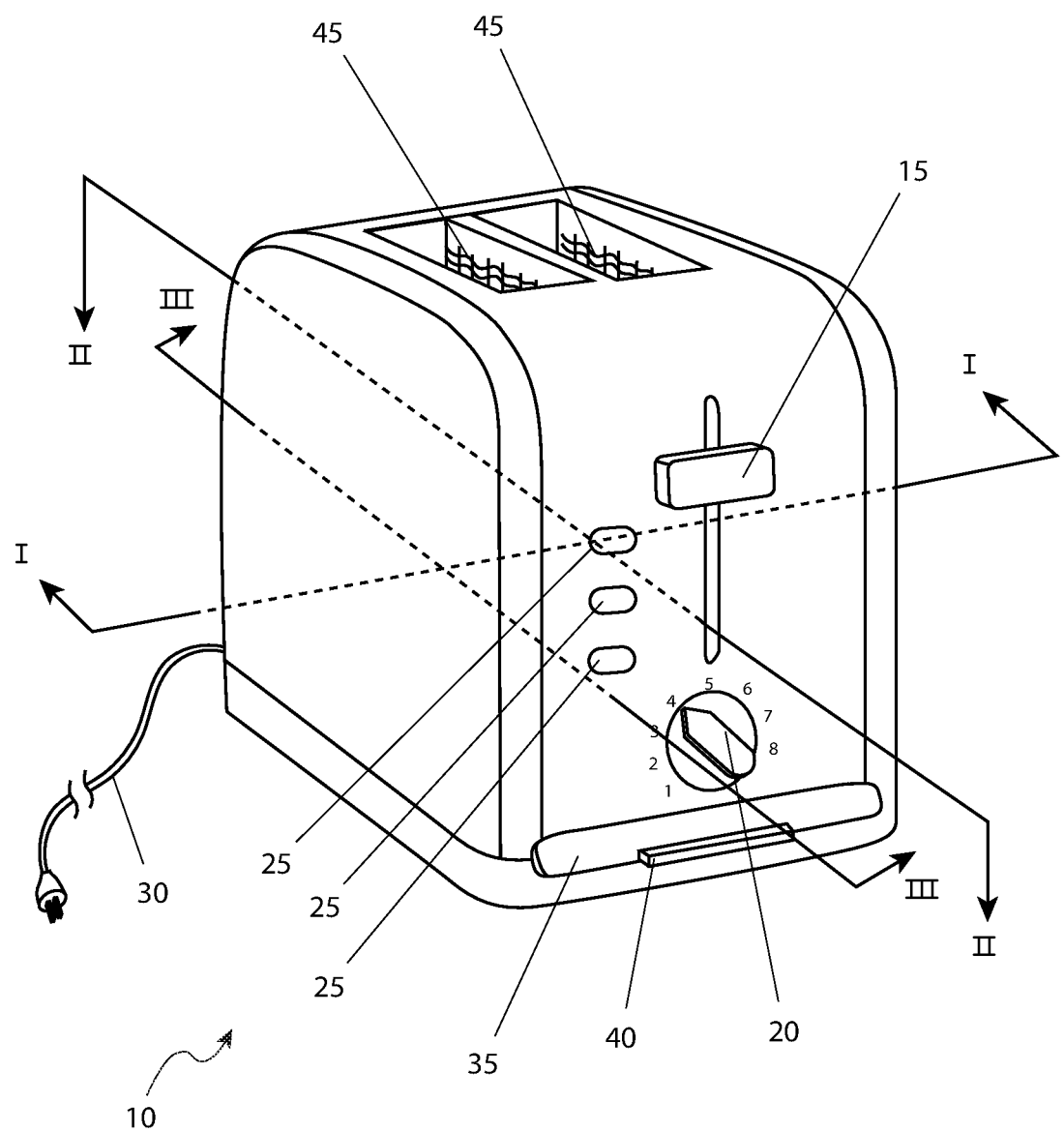
FIG. 1 is a perspective view of a toaster 10 with an improved crumb tray 35, according to the preferred embodiment of the present invention.

10 toaster
15 operating lever
20 timer control
25 operating switch
30 power cord
35 crumb tray
40 handle
45 toasting cavity
50 movable support platform
55 restraint rod
60 electric heating elements
65 heat resistant surface
70 crumbs
75 crumb travel path
80 open top
85 tray slide
90 electromechanical control mechanism
95 tray travel path "t"

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of a toaster 10 with an improved crumb tray 35, according to the preferred embodiment of the present invention is disclosed. The toaster (herein also described as the "device") 10, is an electrically operated, kitchen countertop appliance that is designed to toast bread products such as sliced bread, bagels, muffins, waffles, and the like. The toaster 10 is provided with an operating lever 15, a timer control 20, operating pushbuttons 25, and a power cord 30 to allow and control operation. The operating controls are typical in nature and are not impacted by the teachings of the present invention. The overall appearance of the device 10 depicted in the figure is that of a typical two (2) slice toaster, the teachings of the present invention can also be applied to other variations such as four (4) slice toaster, wide toaster and the like. As such, the use of the device 10 with any particular style of toaster is not intended to be a limiting factor of the present invention.

The device 10 is provided with a crumb tray 35 and an associated handle 40 on the lower portion of the device 10. The crumb tray 35 completely covers the width of any and all toasting cavities 45 and is in sharp contrast to the narrow or otherwise confined nature of conventional crumb trays found on conventional toasters. Further details on the overall width and length of the crumb tray 35 will be provided herein below.

Figure 2:
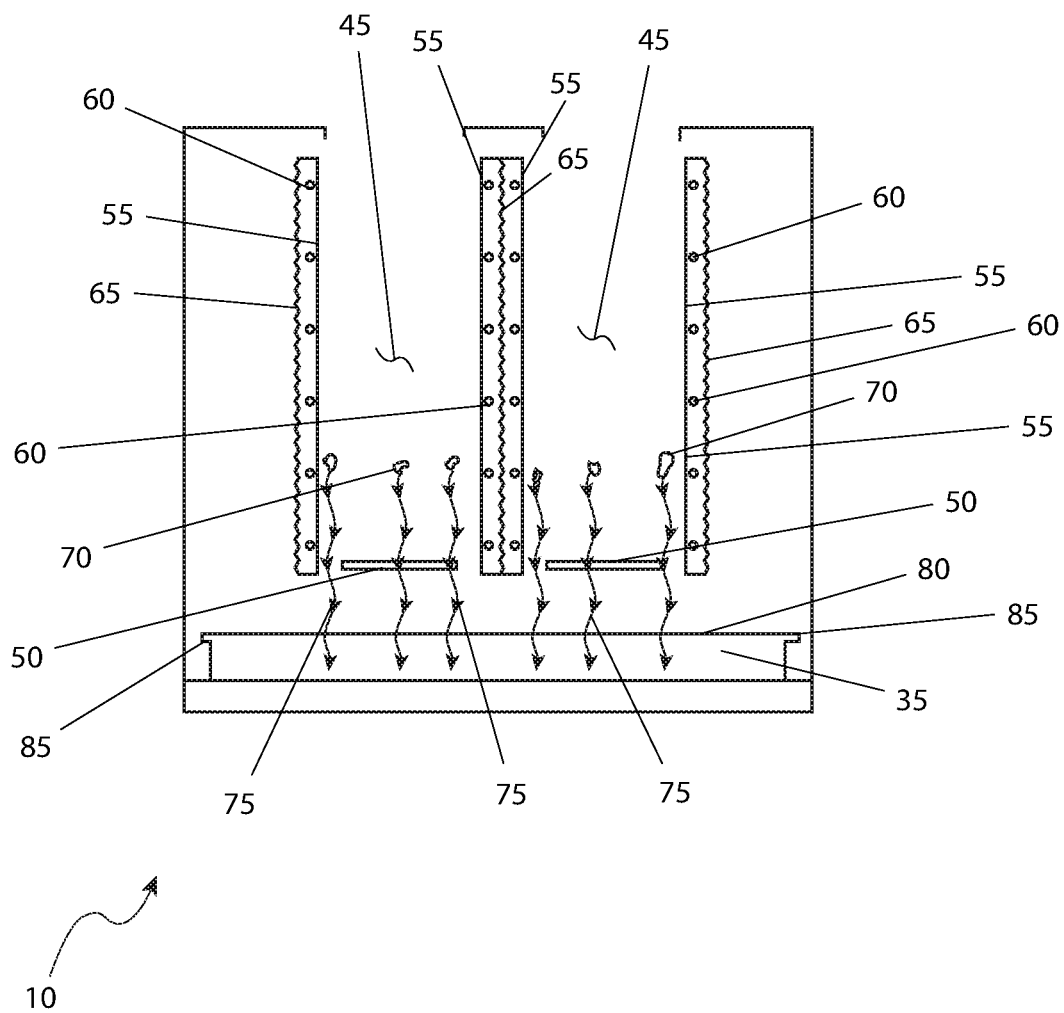
FIG. 2 is a sectional view of the toaster 10 with improved crumb tray 35, as seen along a line I-I, as shown in FIG. 1, according to the preferred embodiment of the present invention.

Referring next to FIG. 2, a sectional view of the device 10, as seen along a line I-I, as shown in FIG. 1, according to the preferred embodiment of the present invention is depicted. The crumb tray 35 is located on the lower portion of the device 10 and occupies nearly the entire width of the device 10 and completely encompasses the area below the toasting cavities 45. The food product being toasted within the toasting cavities 45 is restrained by a movable support platforms 50 (here shown in a downward position as expected during use) as well as restraint rods 55 on the two (2) large sides of the toasting cavities 45. The restraint rods 55 restrain the food product from contacting a plurality of electric heating elements 60 such as nichrome wires. The electric heating elements 60 are displaced along a heat resistant surface 65 such as mica. Crumbs 70 that originate from the food product (not shown) being toasted travel along a crumb travel path 75 and enter the open top 80 of the crumb tray 35 where they remain captive. It is noted that there are no interfering horizontal surfaces along the crumb travel path 75 that can serve to restrain the crumbs 70 and prevent complete cleaning of the device 10. The movable support platform 50 is permeable along its horizontal surface as will be shown herein below. The crumb tray 35 is removable with the aid of the tray slides 85 located along the long slides of the crumb tray 35 near the open top 80.

Figure 3:
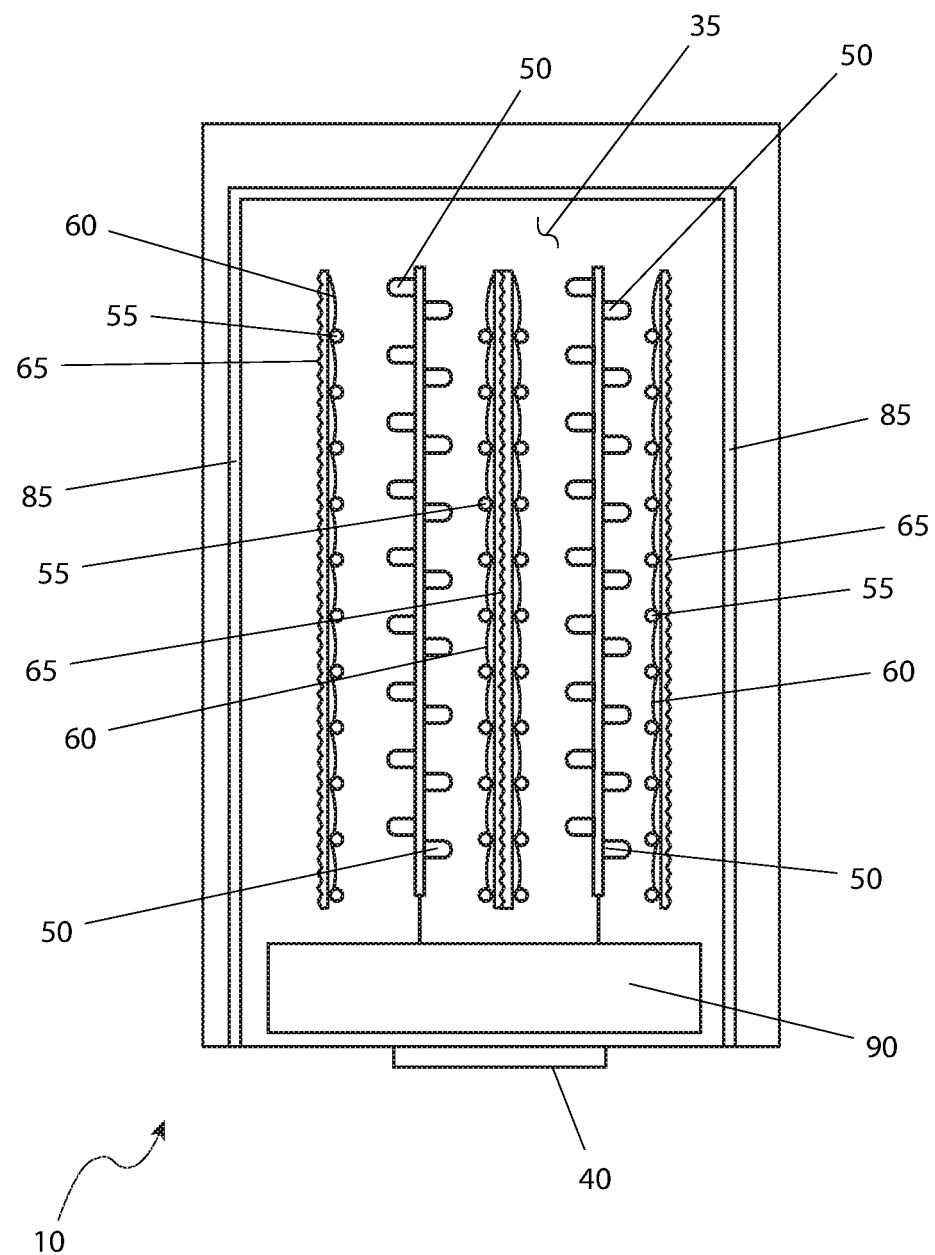
FIG. 3 is a sectional view of the toaster 10 with improved crumb tray 35, as seen along a line II-II, as shown in FIG. 1, according to the preferred embodiment of the present invention.

Referring now to FIG. 3, a sectional view of the device 10, as seen along a line II-II, as shown in FIG. 1, according to the preferred embodiment of the present invention is shown. This view discloses the permeable nature of the movable support platforms 50 as aforementioned described which allows for easy passing of crumbs 70 (not shown) into the crumb tray 35 below. The movable support platforms 50 are connected into an electromechanical control mechanism 90 which control energization, movement and operation of the movable support platforms 50. Operation and configuration of the electromechanical control mechanism 90 are well-known in the art and not within the scope of the present invention. The crumb tray 35 along with its included tray slides 85 and handle 40 remain visible and nearly completely unobstructed. Only the bare minimum components to safely toast the food product such as the restraint rods 55, the electric heating elements 60 and the heat resistant surface 65 are present with no horizontal surfaces to otherwise trap errant crumbs 70 (not shown).

Figure 4:
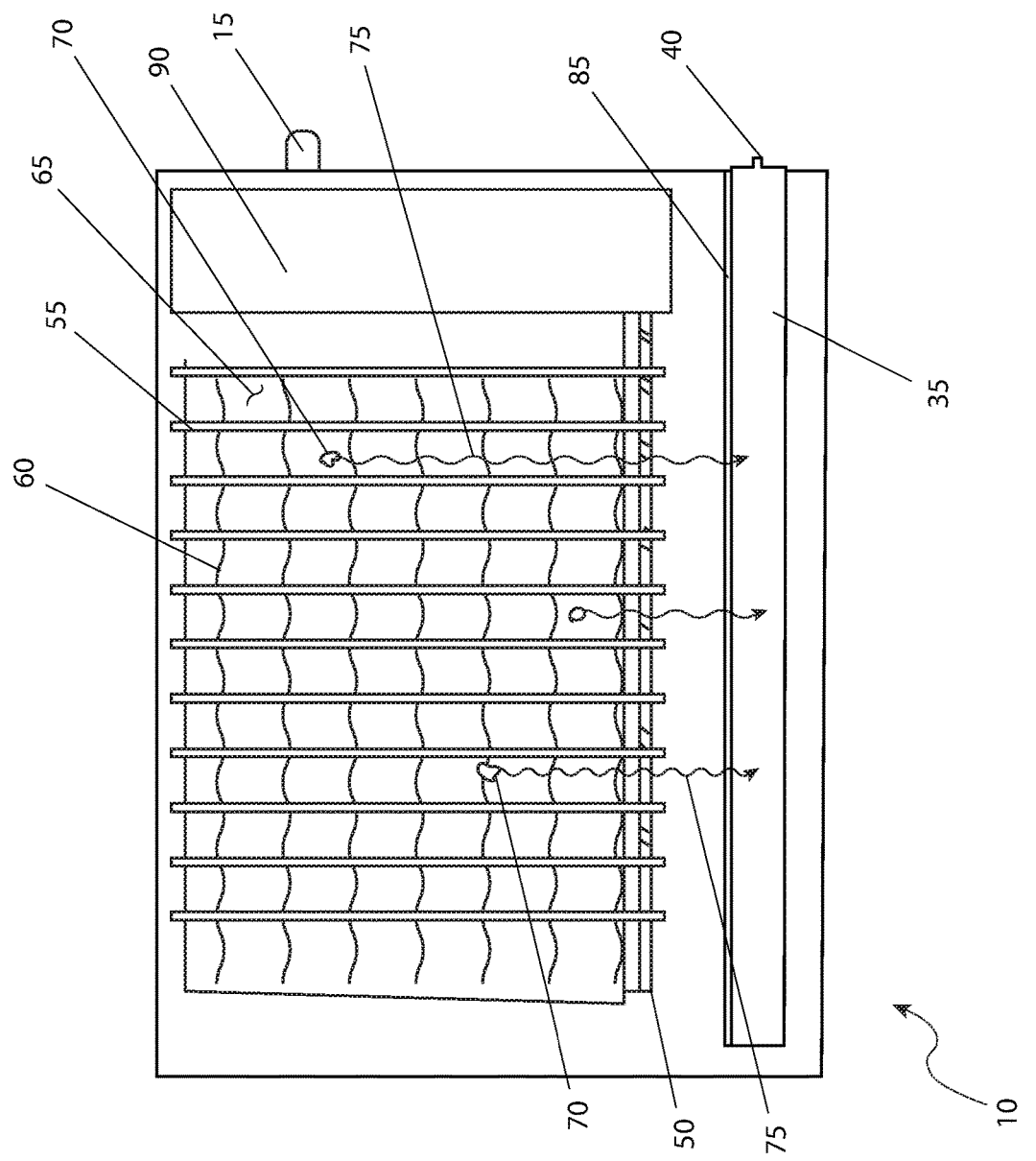
FIG. 4 is a sectional view of the toaster 10 with improved crumb tray 35, as seen along a line III-III, as shown in FIG. 1, according to the preferred embodiment of the present invention.

Referring next to FIG. 4, a sectional view of the device 10, as seen along a line III-III, as shown in FIG. 1, according to the preferred embodiment of the present invention is disclosed. This view provides the third of the three (3) axis views of the interior of the device 10. The heat resistant surface 65 holds the restraint rods 55 and the electric heating elements 60 as is customarily expected inside of a conventional toaster. The movable support platforms 50 provide the lower support for the food product (not shown) being toasted and is permeable as aforementioned described. As such, there is minimal to no obstructions for crumbs 70 that fall down along the crumb travel path 75 into the crumb tray 35 as supported by the tray slides 85 and withdrawn by the handle 40. The movable support platforms 50 are operated and moved by the electromechanical control mechanism 90 as controlled by the operating lever 15 in a conventional manner.

Figure 5:
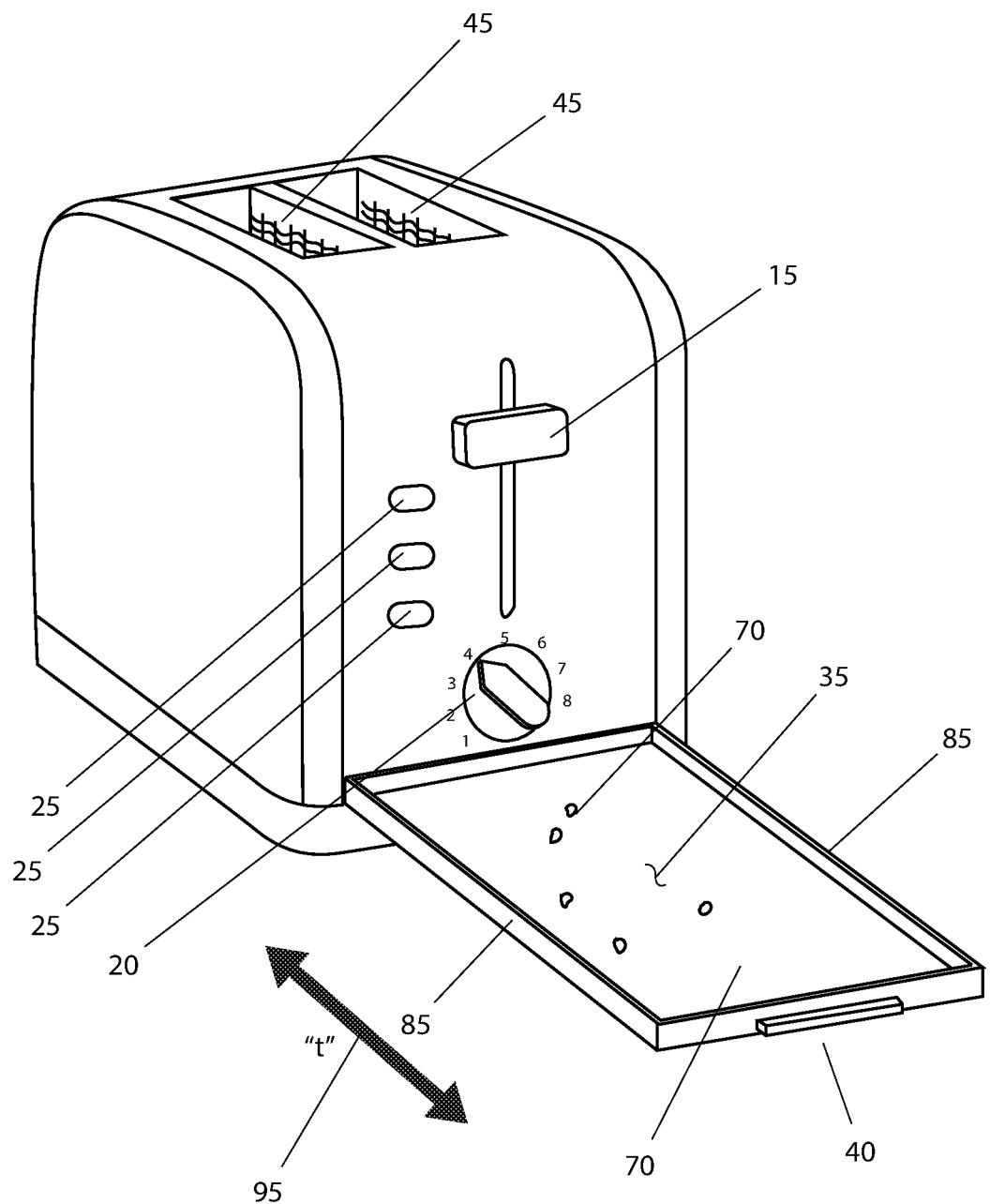
FIG. 5 is a perspective view of the toaster 10 with improved crumb tray 35, shown with the crumb tray 35 in an extended state prior to emptying, according to the preferred embodiment of the present invention.

Referring finally to FIG. 5, a perspective view of the device 10, shown with the crumb tray 35 in an extended state prior to emptying, according to the preferred embodiment of the present invention is depicted. The crumb tray 35 is extended outward from the device 10 along a tray travel path "t" 95 as supported and restrained by the tray slides 85. The user would access the crumb tray 35 by pulling on the handle 40 until it is completely removed from the device 10. At this point in time, the crumb tray 35 could be inverted to empty the captured crumbs 70 into a suitable receptacle such as a sink or trash can. It is noted that the device 10 is operated in a conventional well-known manner using the operating lever 15, the timer control 20, the operating pushbuttons 25 and the toasting cavities 45, thus no new learning is required. Additionally, as most conventional toasters have a crumb tray, albeit narrower than the crumb tray 35, crumb removal remains the same in that regard as well.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as department stores, discount stores, appliance distributors, mail order or internet stores. Special attention would be paid to various configurations parameters such as color, capacity, size, operating controls and the like.

After procurement and prior to utilization, the device 10 would be prepared in the following manner: the device 10 would be located on a suitable horizontal surface such as table, kitchen countertop, or the like; the power cord 30 would be connected to a suitable source of electric power; and an appropriate food such as sliced bread, bagels, muffins, waffles, or the like would be inserted into at least one (1) of the toasting cavities 45.

During utilization of the device 10, the following procedure would be initiated: various processing parameters would be adjusted using the timer control 20 and/or the operating pushbuttons 25; and the toasting process would be initiated by pressing the operating lever 15 down.

After use of the device 10, and all toasting operations are completed, the following cleaning process would be followed: the device 10 would be allowed to cool; the device 10 would be disconnected from the source of electric power by unplugging the power cord 30 from the source of electric power; the crumb tray 35 would be removed from the device 10 by grasping the handle 40 and pulling the crumb tray 35 outward along the tray travel path "t" 95; the crumb tray 35 would then be emptied by inverting it over a suitable location such as a sink, trash can or the like; said crumb tray 35 would then be wiped or washed clean, dried, and re-inserting it into the device 10 by aligning the tray slides 85 and following the tray travel path "t" 95. At this point in time, the device 10 may be stored until needed again in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A toaster, consisting of:
an operating lever;
a timer control;
a plurality of operating push buttons;
a power cord controlling operation of the toaster;
a crumb tray and an associated handle disposed on a lower portion of the toaster, the crumb tray completely covers a width of a plurality of toasting cavities; and
a movable support platform having a permeable horizontal surface, the movable support platform allows for passing of a plurality of crumbs into the crumb tray;
wherein the toaster is an electrically operated kitchen countertop appliance that toasts a food product;
wherein the food product toasted within the toasting cavities is restrained by a plurality of movable support platforms as well as a plurality of restraint rods;
wherein the restraint rods restrain the food product from contacting a plurality of electric heating elements;
wherein the crumbs travel along a crumb travel path and enter an open top of the crumb tray where they remain captive;
wherein there are no interfering horizontal surfaces along the crumb travel path that serve to restrain the crumbs and prevent complete cleaning of the toaster;
wherein the movable support platforms are connected into an electromechanical control mechanism which control energization, movement and operation of the movable support platforms;
wherein the restraint rods, the electric heating elements and the heat resistant surface are present with no horizontal surfaces to otherwise trap the crumbs;
wherein the user would access the crumb tray by pulling on the handle until it is completely removed from the toaster;
wherein the crumb tray is removable with aid of a plurality of tray slides located along a plurality of long sides of the crumb tray near the open top;
wherein the crumb tray is configured to be inverted to empty the captured crumbs into a receptacle;
wherein the receptacle is a sink or other container; and
wherein the movable support platform is permeable.

2. The toaster according to claim 1, wherein the electric heating elements are a plurality of nichrome wires.

3. The toaster according to claim 1, wherein the electric heating elements are displaced along a heat resistant surface.

4. The toaster according to claim 3, wherein the heat resistant surface is mica.

5. The toaster according to claim 1, wherein the movable support platforms provide a lower support for the food product being toasted.

6. The toaster according to claim 1, wherein the crumb tray along with the tray slides and the handle remain visible and unobstructed.

* * * * *